United States Patent [19]

Wolfe

[11] 4,422,099
[45] Dec. 20, 1983

[54] OPTICAL COMMUNICATION ON VARIABLE POWER BEAM

[75] Inventor: Larry L. Wolfe, Broomfield, Colo.

[73] Assignee: International Business Machines Corporation, Armonk, N.Y.

[21] Appl. No.: 345,492

[22] Filed: Feb. 3, 1982

[51] Int. Cl.³ .......................... H04N 1/24; H04N 1/30
[52] U.S. Cl. .................................... 358/293; 350/358; 358/285; 455/611; 455/615
[58] Field of Search ................ 358/293, 285; 455/611, 455/615; 350/358

[56] References Cited

U.S. PATENT DOCUMENTS

| | | | |
|---|---|---|---|
| 3,835,249 | 9/1974 | Dattilo et al. | 358/285 |
| 3,898,627 | 8/1975 | Hooker et al. | 364/200 |
| 4,008,966 | 2/1977 | Frank et al. | 356/218 |
| 4,118,113 | 10/1978 | Chang et al. | 350/358 |
| 4,144,539 | 3/1979 | Davie et al. | 346/160 |
| 4,336,981 | 6/1982 | Mori | 350/358 |
| 4,367,926 | 1/1983 | Hohki | 350/358 |

OTHER PUBLICATIONS

IBM Technical Disclosure Bulletin, "Laser Printhead", D. E. Grant and D. W. Stafford, vol. 22, No. 8B, Jan. 1980, pp. 3585–3586.

*Primary Examiner*—Howard Britton
*Attorney, Agent, or Firm*—Carl M. Wright

[57] ABSTRACT

An acousto-optic deflector may selectively deflect an applied light beam. The remaining undeflected zero-order beam varies considerably in power depending upon whether the beam is deflected. The zero-order beam is modulated and directed at a detection arrangement to detect a characteristic of the beam other than the selective deflection power variation. The modulation and detection is best employed to detect position feedback for an informational writing beam. An exemplary detection arrangement having a defined ringing frequency with a long shift time constant detects an amplitude modulation of the beam having a significantly higher frequency than that of the selective deflection power variation. The feedback may be in the form of an oscillation representing the position of the deflected beam as it is swept in a raster format and the detection arrangement detects the amplitude oscillations as indicative of the feedback.

29 Claims, 7 Drawing Figures

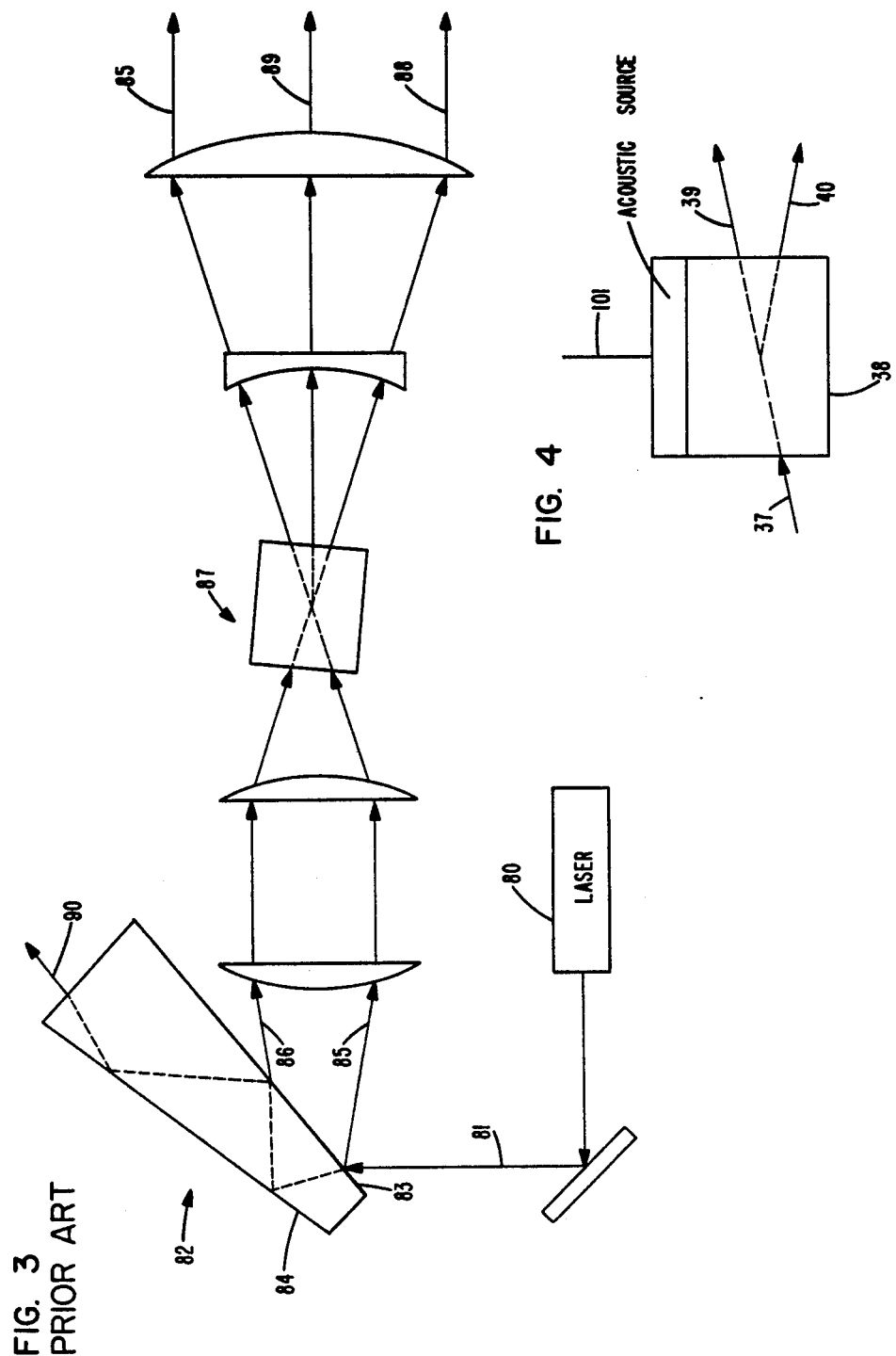

OPTICAL COMMUNICATION ON VARIABLE POWER BEAM

BACKGROUND OF THE INVENTION

1. Field Of The Invention

This invention relates to optical communication, and, more particularly, to optical printing with a beam subject to extreme power variation.

2. Brief Description Of The Background

Optical communication is of benefit in many applications, and is a necessity for providing feedback for synchronizing optical printing systems of high quality. Such printing systems utilize a laser light source to form a light beam which is modulated by data to be printed and is swept in a raster pattern to selectively discharge a statically charged photoconductor, forming a latent charge image. The latent image is dusted with toner, which is transferred to a sheet of paper and then affixed to the paper.

It is important in printing to have exact alignment of adjacent scan lines so that printing transverse to the scans appears continuous and smooth. Any misalignment becomes highly apparent, degrading the print quality.

The scanning motion of the light beam is usually effected by a rotating mirror, and the data modulation of the beam is controlled by a precision gating device. The two devices must be accurately synchronized throughout each scan.

An example of such a printer is described in U.S. Pat. No. 3,835,249, A. Dattilo and D. Zegafuse Jr., issued Sept. 10, 1974 filed Dec. 26, 1972, Ser. No. 317,976, "Scanning Light Synchronization System," assigned in common with the present application. In that printer, synchronization is accomplished by supplying feedback signal indicative of the beam position to a shift register which precisely gates the printing data. The feedback is taken from the modulated laser writing beam as it scans using a beam splitter. Specifically, an acousto-optic modulator responds to the print data by deflecting the laser beam. Both the deflected and undeflected beams are given a scanning motion by a rotating mirror and are directed to a beam-splitting mirror. A portion of the beams (about 75%) continue through the mirror to a knife-edge slit where the normal (undeflected) beam is blocked and the deflected beam continues on to erase the static charge on a photoconductor. The reflected portion of the beam (about 25%) traverse a position optical grating system to be modulated thereby and provide the position feedback to a detector.

A similar system is employed for the IBM 6670 Information Distributor where the beam-splitting mirror is replaced by a wedge prism located prior to the acousto-optic modulator. This arrangement is described in *IBM Technical Disclosure Bulletin*, Vol. 22, No. 8B, D. Grant and D. Stafford, "Laser Printhead," pages 3585-6, Jan. 1980. The prism directs about 60% of the laser beam to the modulator at the Bragg angle to be selectively deflected thereby in accordance with the print data, and directs about 20% of the beam to the modulator at a different angle so that it is not selectively deflected. As before, the writing beam is scanned and either blocked by a knife-edge or erases the charge on the photoconductor. The split beam is then scanned and used in the synchronizing system, but the split beam is not at the Bragg angle and is not affected by the selective deflection of the modulator.

In each of these systems, only a portion of the laser beam ultimately becomes the writing beam, 60% in the prism system and 75% in the beam-splitting mirror system. Therefore, the power, the cost, and the power consumption of the laser are all greater than those required for the writing beam alone.

SUMMARY OF THE INVENTION

The present invention allows elimination of the above beam-splitting systems where less than the total light beam is deflected from the zero-order path by providing apparatus and method for modulation of the undeflected zero-order beam substantially different from that of the greater power variation from the selective deflection, and receiving and detecting the modulated zero-order beam, detecting the substantially different modulation without detecting the selective deflection.

A specifically detailed aspect of the invention may additionally comprise modulating the zero-order undeflected beam at a significantly higher frequency than the selective deflection, and detecting the received beam with a detector having a defined ringing frequency at the significantly higher frequency and having a long shift time constant.

BRIEF DESCRIPTION OF THE DRAWINGS

FIG. 3 is a cross sectional illustration of a prior art optical arrangement;

FIG. 4 is an illustration of an acousto-optic modulator according to the present invention;

DESCRIPTION OF THE INVENTION

Figure 1:
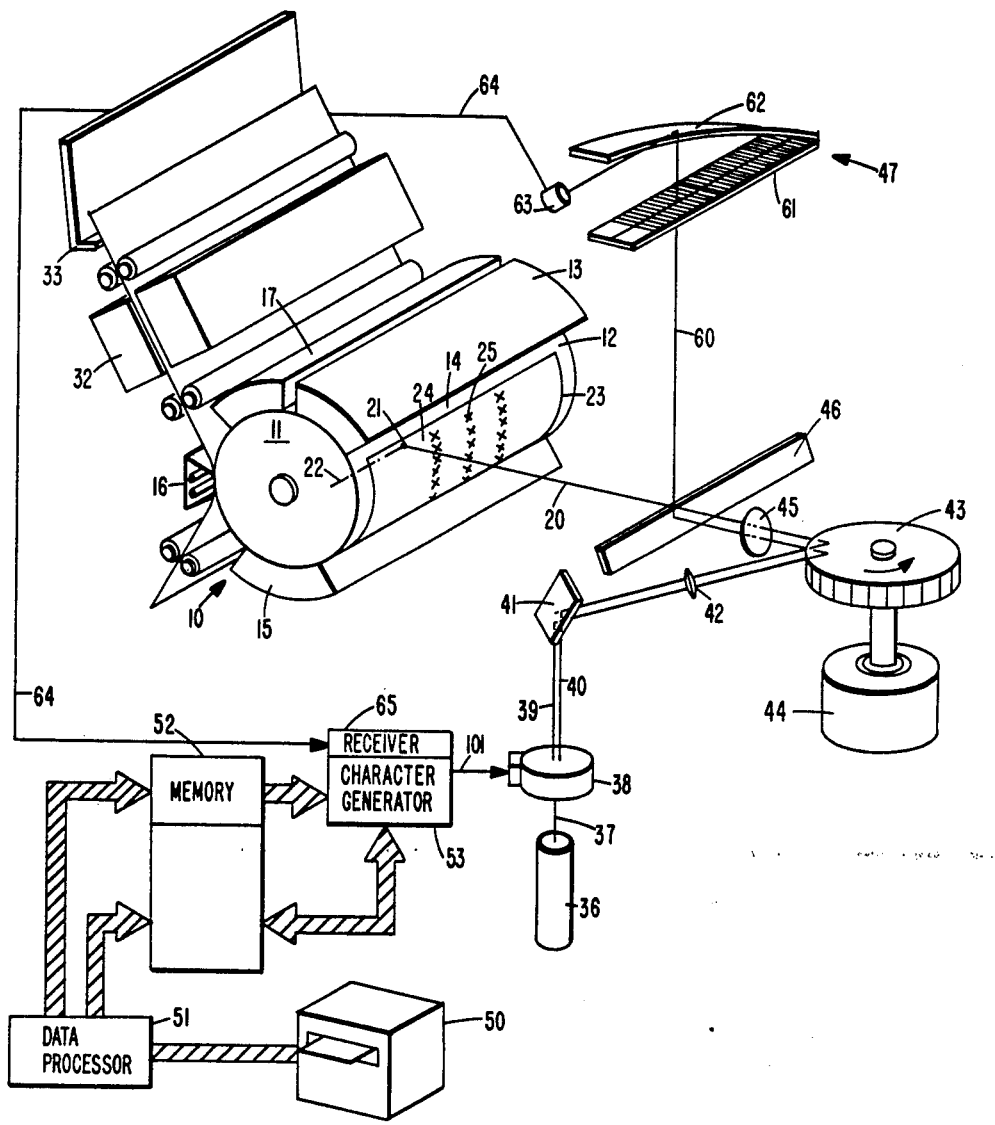
FIG. 1 is a simplified pictorial illustration of an optical printer using an optical feedback communication system constructed in accordance with the present invention.

FIG. 1 shows an electrophotostatic page printer 10 with associated image generation and control components, having an optical position feedback communications system constructed in accordance with the present invention.

Briefly, in FIG. 1, page printer 10 includes an electrophotographic drum 11 having an image receiving photoconductive surface member 12. Drum 11 and surface 12 are rotated past a charging station 13, an exposure station 14, a development station 15, a transfer station 16 and a cleaning station 17. The charging station 13 applies a uniform electrical charge to the photoconductive surface member 12. At the exposure station 14, the uniform electrical charge is selectively dissipated by light beam 20 which forms a spot 21 on surface 12 that transverses path 22 extending parallel to the axis of rotatation 11a of drum 11. Selective exposure of the charged area by spot 21 generates an electrostatic latent image of a page 24. Preferably, the selective discharge is due to a binary (on/off) beam 20 and spot 21, which generates a latent image 23 comprising an electrophotoconductive discharged background area 24 and a charged image area 25. The latent image 23 is then rotated to developer station 15 where a colored toner is applied to the image and which adheres to the charged areas only. The developed toner image is transferred at station 16 to a sheet 30 by electrostatic force.

The sheet 30 with the transferred toner image thereon is passed through fixing station 32 where heat or other suitable means causes the toner to adhere to the sheet and to form thereby a permanent image. The sheet 30 is then delivered to an exit pocket or tray 33 where it can be subsequently removed. Any of the toner powder remaining on the photoconductive surface 12, as it leaves transfer station 16, is cleaned at station 17 prior to a recharging of the surface 12 at station 13 for further print operations.

Specific details of an electrophotographic printer such as printer 10 are well known to those skilled in the art and form no part of this invention except for the optical communication feedback system which will be explained. It is to be understood that a variety of techniques exist for performing the various electrophotographic printer functions identified.

Binary light beam 20 is preferably generated by a source of high energy coherent light, such as a continuous mode laser 36 which projects a laser beam 37 along an optical path through a modulator 38.

As will be described in more detail, the modulator 38 selectively transmits the laser beam along zero-order path 39, or along a deflected path 40. The beams are directed, via one or more mirrors 41 and lens systems 42 to a scanning mirror 43. The multifaceted scanning mirror 43 is rotated by motor 44 to move the beam 20 along the linear scanning path 22. Both beams are projected through lens 45 to mirror and knife-edge assembly 46. Any of the light proceeding along zero-order path 39 is reflected by mirror and knife-edge 46 to position feedback apparatus 47. Any light directed along selective deflection path 40 is not intercepted by the mirror and knife-edge 46 and proceeds along path 20 to photoconductive surface 12 of drum 11, forming spot 21 and discharging the photoconductor thereat. As an example, the print dot density, each dot representing a picture element, or pel, of a scan along path 22, may be 240 pels per inch. The orthogonal pel density, comprising the number of scan lines or paths 22 may also be 240 per inch. The data to be printed may comprise either pictorial or text data. Text data may be derived, for example, from a magnetic card or tape reading device 50, which delivers the page text data to be printed to a data processing apparatus 51. In this manner, the text data is assembled and stored in a page memory 52. The text characters and symbols to be printed, as well as the spaces to be inserted between characters, are stored in the page memory 52 at individual memory addresses which are, in turn, associated with the writing lines of the page and with the other positions of the characters within the writing line. For example, a multi-bit data word defining a single character would be stored in the page memory 52 at an address that is identified with a particular set of scan lines and a particular character position therein. Once the text has been assembled in the page memory 52, a character generator 53 operates to provide the necessary binary dot-pattern control of the modulator 38 to reproduce the page text.

Details of the memory 52, the character generator 53, and the data processor 51 are well known to those skilled in the art and form no part of the invention. An example of such apparatus is described in U.S. Pat. No. 3,898,627, R. W. Hooker et al, filed Mar. 22, 1974, application Ser. No. 454,025, assigned in common with the present invention. It is to be understood that a variety of techniques exist for performing the functions identified.

Important to the present invention is the use of the zero-order beam 39, as reflected by mirror 46 along path 60 for providing position feedback communication. As the beam 39, 60 is moved through its scanning motion by the rotating mirror 43, the beam is projected through an optical grating 61 onto an elliptical mirror 62, which reflects the light to a photodetector 63 positioned at one focus of the mirror 62. The facet of rotating mirror 43 which reflects the beam is located at the other focus of the mirror 62. The optical geometry of the system is selected so that the grating 61 is located to be optically equivalent to exposure station 14. The photodetector 63 thus generates an electrical signal on line 64 modulated both by the selective deflection from the zero-order path 39 to the deflected path 40 and by the modulation provided by the grating 61. This signal is supplied to a receiver 65 for decoding and for generating a gating or read clock signal to control the supply of binary data by the character generator 53 to modulator 38.

Figure 2:
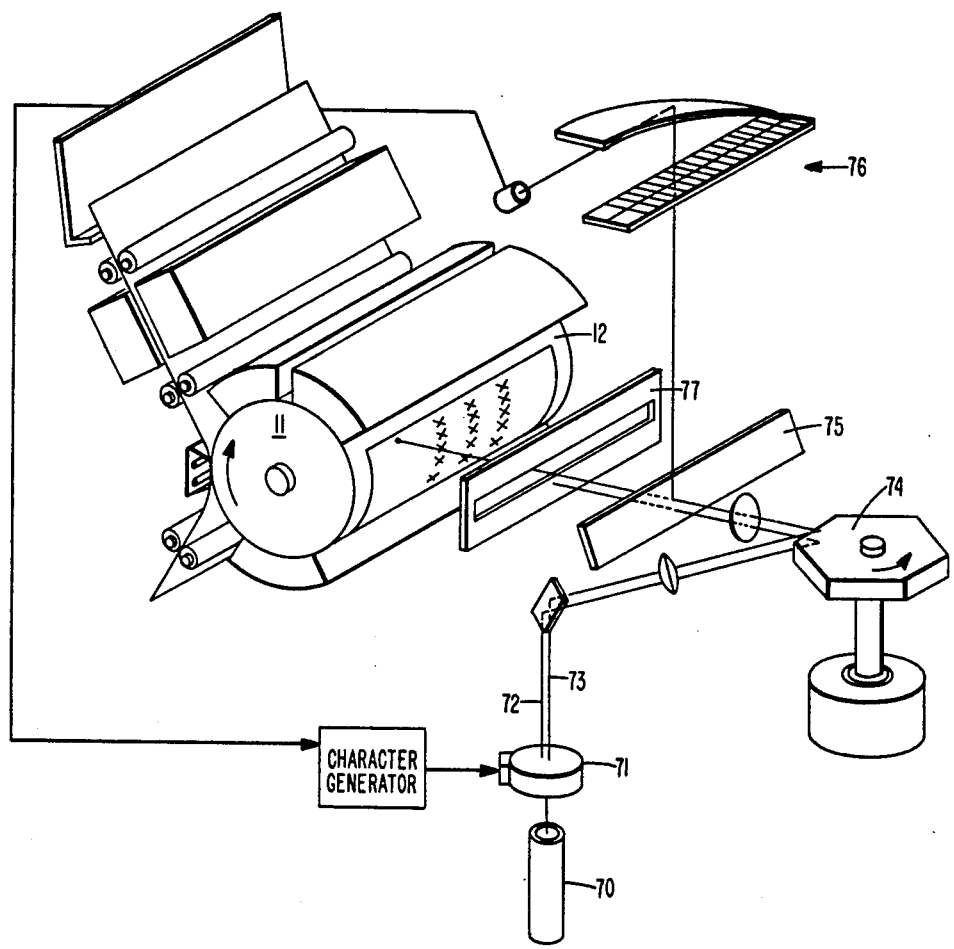
FIG. 2 is a simplified pictorial illustration of a prior art optical feedback arrangement.

Previously, the zero-order beam was not employed for feedback purposes. As an example, FIG. 2 illustrates a prior art system wherein a laser 70 produces a beam which is selectively deflected by modulator 71 from a zero-order path 72 to a selective deflection path 73 and both beams are scanned by rotating scanning mirror 74. A beam splitting mirror 75 intercepts a portion of the laser beam along both paths 72 and 73 as the beam is moved through its scanning motion by mirror 74 and diverts this portion through a feedback optical grating system 76 having a line density of 120 opaque lines per inch. Light traversing the zero-order path 72 and continuing through beam splitting mirror 75 is intercepted by knife-edge 77 so as to not intercept surface 12 of drum. If the beam is emitted along the deflection path 73 and traverses through beam splitting mirror 75, it will be directed past the knife-edge 77 and strike the photoconductive surface 12.

Beam splitter 75 in FIG. 2 splits approximately 25% of the laser beams 72 and 73 to feedback arrangement 76, leaving approximately 75% of the laser power for selective discharge of the photoconductive surface 12.

FIG. 3 illustrates an alternative prior art system, which avoids the need for beam splitter 75 of FIG. 2. A laser 80 provides a single continuous beam 81 to a wedge prism 82, having non-parallel front and back faces 84 and 83 separated by a small angle, e.g., 15 minutes. Because of the wedge shape, the prism 82 generates two slightly spaced beams 85 and 86. Both beams are directed to a modulator 87, but at different angles. Beam 86 is the writing beam and is incident on the modulator at the Bragg angle, whereas detector beam 85 is not. Therefore, the image data which controls modulator 87 is operable selectively to deflect only beam 86, and not beam 85. Beam 86 is selectively deflected from the zero-order path 88 to a selectively deflected path 89 by the modulator 87. Zero-order beam 88 is subsequently intercepted by a knife-edge, and beam 89 is employed to discharge a photoconductor. Beam 85 is unaffected by the changing state of energization of modulator 87 and therefore remains constant, and is employed in a beam position feedback system.

Wedge prism 82 breaks beam 81 into a writing beam 86 having approximately 60% of the power of the original laser beam 81, a detector beam 85 having approximately 20% of the original power, and other scattered beams 90 having another approximately 20% of the power of the original laser beam 81. Thus, only 60% of the laser power is available to be modulated for writing. The modulator 87 is also not 100% efficient, and therefore the ultimate writing power of beam 89 is less than 60% of the original output of laser 80.

In FIGS. 1 and 4, the present invention allows utilization of only the zero-order beam 39 for feedback detection and the first order beam 40 for writing. No beam splitting devices need be employed, therefore allowing use of a lower cost, less powerful laser 36 than the previous systems. Between 90% and 95% of the incoming laser beam 37 is deflected by modulator 38 to become the first order writing beam 40. By ultimately employing a greater percentage of the laser power for writing, i.e., erasing the photoconductor, further efficiencies may be made. The present invention has the additional advantage of allowing the driver current supplied at input 101 (FIG. 1) to be somewhat reduced.

Figure 6:
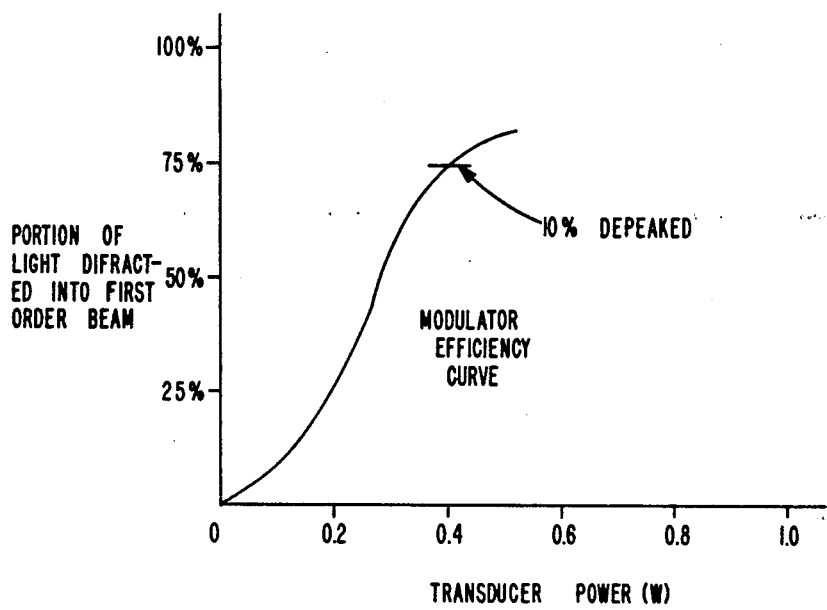
FIG. 6 is a graph illustrating the efficiency of an acousto-optic modulator.

As discussed above, the zero-order beam scans horizontally via each facet of the rotating mirror assembly 43 and is reflected by mirror and knife-edge assembly 46 along path 60 to the feedback grating assembly 47. Grating 61 modulates beam 60 as it is scanned horizontally by rotating mirror 43 to become modulated zero-order beam 120. The amplitude of beam 120 as sensed by optical sensor 63 is illustrated in FIG. 6. Grating 61 comprises a sufficient number of lines to modulate beam 60 at a significantly higher frequency than the modulation produced by the selective deflection of the laser beam 37 by the acousto-optical modulator 38. For example, if the maximum modulation frequency of acousto-optic modulator 38 is six pels of imaging along scan line 22 on the surface 12 of drum 11, then the grating 61 should have one line per two pels. This provides a ratio between the two modulation frequencies of 3:1 which is found to be suitable.

Figure 5:
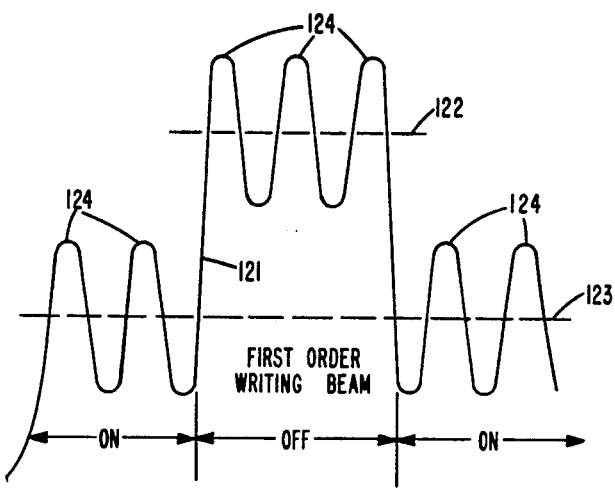
FIG. 5 is an amplitude versus time graph of the optical feedback sensor output voltage.

The modulated beam as received by optical sensor 63 is represented by waveform 121 in FIG. 5. The low frequency pulse 122 comprises the surge in zero-order beam power when the first order writing beam is turned off. When the first order writing beam is on, the zero-order drops to a significantly reduced amplitude, but does not go to zero, as illustrated by the lower amplitude waveform 123. Even with the modulator 38 operating at its highest efficiency, 5% to 10% of the incoming laser power remains in the zero-order beam.

From the curve in FIG. 6, it can be seen that the modulator 38 may be operated at a power level somewhat less than that of maximum light defraction efficiency. Specifically, by operating the modulator at a level of light defraction efficiency 10% below the peak, a significant amount of power may be saved while placing the modulator on a steeper section of its efficiency curve. This allows the driver to be adjusted to vary the power applied at input 101 to the transducer to compensate for laser power changes.

Therefore, the zero-order beam power will be approximately 18% of the incoming laser power when the first order writing beam is on. With the first order writing beam off, the zero-order beam jumps to the level 122 with approximately 96% of the incoming laser power. The modulation due to grating 61 then becomes a higher frequency perturbation 124 on the lower frequency major power changes 122 and 123.

Signal 121 provided by sensor 63 is supplied on line 64 to receiver 65. Receiver 65 is arranged to detect the perturbations 124 of the higher grating frequency while essentially ignoring the lower frequency power changes 122 and 123 to the incoming signal 121. Each pulse 124 is then detected as indicating a single grating line of grating 61. These grating lines are indicative of the instantaneous position of beam 60 along the grating, which comprises a feedback of the position of beam 20 and spot 21 along scan line 22. To synchronize the generation of the image picture elements through the modulation of laser beam 37, the pulses 124 detected by receiver 65 are employed to control the gating of individual binary bits by the driver of image generator 53 to line 101. Thus, the feedback accomplishes the synchronization of the character generation with the instantaneous position of the writing spot 21 on surface 12 of drum 11, irrespective of the instantaneous translation along line 22 of the writing beam due to non-linearity which may result from the uniform rotation speed of mirror 43 and the slightly differing optical distance from lens 42 to surface 12 in view of the flatness of each facet of the rotating mirror 43.

Figure 7:
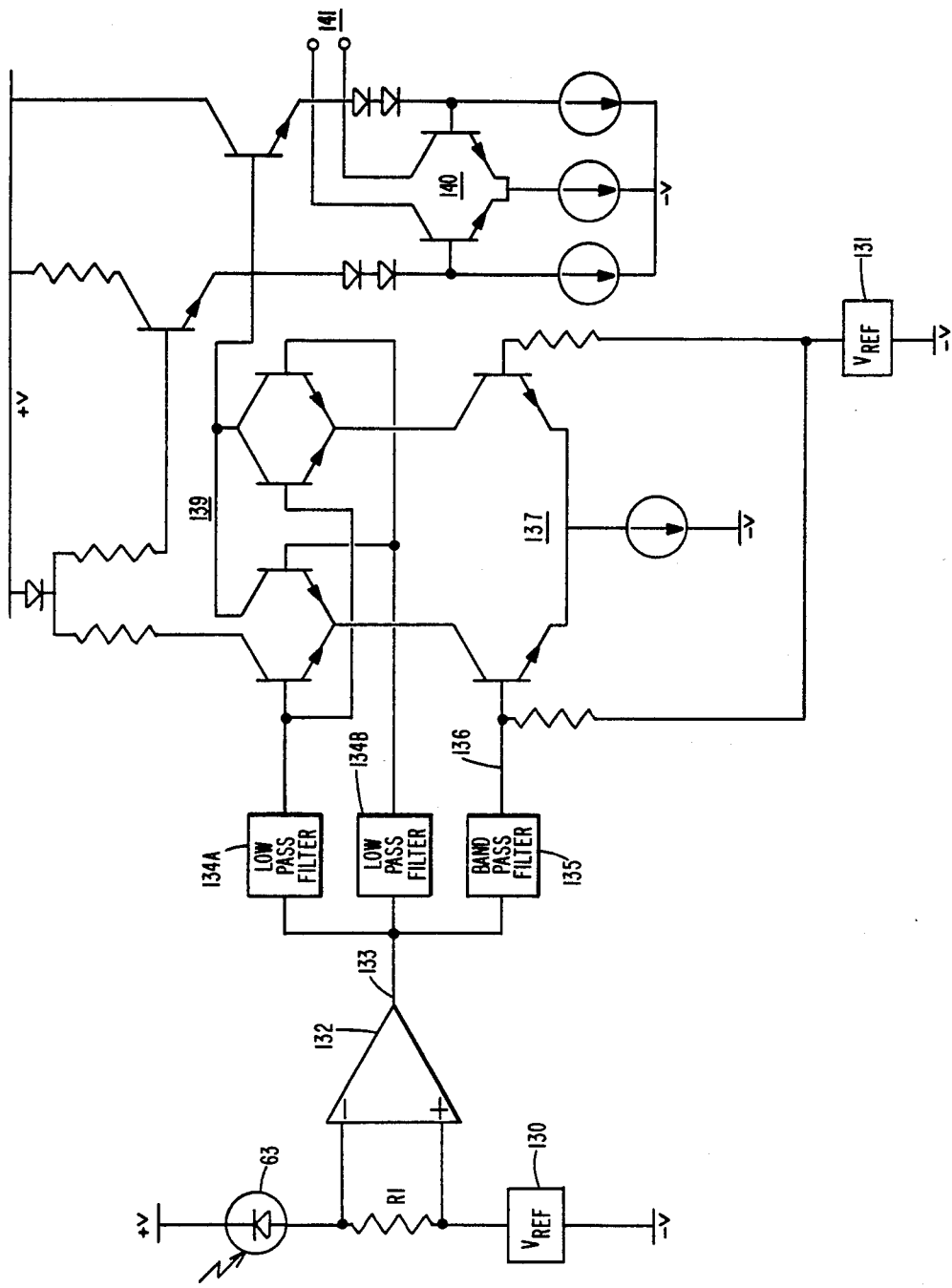
FIG. 7 is a schematic diagram of the receiver of FIG. 6.

FIG. 7 is a schematic of the circuitry of receiver 65. Specifically, reference voltage circuits 130 and 131 provide reference voltages for operating the other circuits.

The current through the photodetector 63 is sensed across a resistor R1 coupled to a different preamplifier 132. The preamplifier converts the photodetector current, comprising a high frequency grating signal superimposed on a low frequency signal, into an amplified voltage signal at its output 133. The voltage signal is supplied to two low pass filters 134a and 134b and to a bandpass filter 135. The bandpass filter allows only the desired high frequency signal to pass to the input 136 of a differential amplifier 137. The low pass filters 134a and 134b are coupled to variable threshold gating circuit 139. The low pass filter 134a has a large time constant, causing it to pass the average value of the input signal and establishes the threshold. The low pass filter 134b has a small time, causing it to pass the low frequency portion of the input signal. When the output signal from the low pass filter 134b is greater than the output signal from the low pass filter 134a, i.e., the threshold, the gating circuit 139 passes the amplified bandpass signal to the squaring circuit 140.

The gating circuit 139 directs current from the differential amplifier either into switching the output stage or away from the output stage depending on the polarity of the low frequency signal with respect to the threshold. This eliminates the ringing and noise associated with a bandpass filter and noisy machine environment. The squaring circuit 140 supplies the received signal across output terminals 141.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a deflection system for selectively deflecting a major portion of a light beam from a zero-order path, feedback apparatus comprising:

light responsive means for providing a signal representative of a characteristic of an applied light beam;

feedback means for applying a feedback representation to an undeflected portion of said light beam of said zero-order path, said feedback representation modulating said characteristic of light beam substantially different from said selective deflection;

means for directing said undeflected portion of said light beam of said zero-order beam to said light responsive means; and detector means responsive to said representative signal for detecting said feedback representation modulation without detecting said selective deflection.

2. The apparatus of claim 1 wherein:
said feedback means additionally comprises means for applying a modulation of said zero-order major light beam at a significantly different frequency than said selective deflection.

3. The apparatus of claim 2 wherein:
said detector means additionally comprises means for detecting only a range of frequencies immediately surrounding said significantly different major frequency.

4. The apparatus of claim 3 wherein:
said detector means additionally comprises circuit means tuned to said significantly different major frequency and having a long shift time constant.

5. The apparatus of claim 2 wherein:
said detector means additionally comprises circuit means having a defined ringing frequency at said significantly different major frequency.

6. The apparatus of claim 2 wherein:
said significantly different major frequency of said feedback means comprises a significantly higher frequency.

7. The apparatus of claim 6 wherein:
said detector means additionally comprises circuit means having a defined ringing frequency at said significantly higher frequency and having a long shift time constant.

8. The apparatus of claim 2 wherein:
said feedback means additionally comprises means for modulating the amplitude of said zero-order light beam at a significantly different major frequency than said selective deflection.

9. The apparatus of claim 8 wherein:
said detector means additionally comprises means for detecting an amplitude modulated signal for only modulation at a range of frequencies immediately surrounding said significantly different major frequency.

10. The apparatus of claim 9 wherein:
said detector means additionally comprises circuit means having a defined ringing frequency at said significantly higher frequency and having a long shift time constant.

11. The apparatus of claim 8 wherein:
said deflection system further comprises a scanning system for sweeping said deflected beam in repeated linear scans, and wherein:
said feedback means additionally comprises means for modulating the amplitude of said zero-order light beam in accordance with the position of said deflected beam along said linear scans.

12. The apparatus of claim 11 wherein:
said detector means additionally comprises means for detecting an amplitude modulated signal for only modulation at approximately said significantly major frequency.

13. The apparatus of claim 12 wherein:
said detector means additionally comprises means for counting oscillations of said detected modulated signal, said count of oscillations indicating the position of said deflected beam along said linear scans.

14. The apparatus of claim 13 wherein:
said significantly different major frequency of said feedback means comprises a significantly higher frequency; and
said detector means additionally comprises circuit means having a defined ringing frequency at said significantly higher frequency and having a long shift time constant.

15. In a selective light beam deflection system for projecting a zero-order beam along a normal zero-order path and for selectively deflecting an information beam from said zero-order path to an information beam path, comprising a substantial proportion of the power of said zero-order beam, zero-order beam communication apparatus comprising:
modulation means for modulating said zero-order beam substantially different than the power change of said selective deflection; and
receiver means responsive to said modulated zero-order beam of said modulation means for detecting said modulation without detecting said selective deflection.

16. The apparatus of claim 15 wherein:
said modulation means comprises means for modulating said zero-order beam at a significantly different major frequency than that of said selective deflection.

17. The apparatus of claim 16 wherein:
said receiver means additionally comprises means for detecting only approximately said significantly different major frequency.

18. The apparatus of claim 16 wherein:
said significantly different major frequency of said modulation means comprises a significantly higher major frequency.

19. The apparatus of claim 18 wherein:
said receiver means additionally detection means having a defined ringing frequency at said significantly higher frequency and having a longer shift time constant.

20. The apparatus of claim 18 wherein:
said receiver means additionally comprises detector means timed to said significantly higher major frequency and having a long shift time constant.

21. The apparatus of claim 20 wherein:
said receiver means additionally comprises sensor means for detecting each oscillation of said detected modulated beam.

22. The apparatus of claim 21 wherein:
said receiver means additionally comprises detector circuit means having a defined ringing frequency at said significantly higher major frequency and having a long shift time constant, for detecting said modulated beam; and
said sensor means of said receiver means is additionally responsive to said detector circuit means for detecting said oscillations.

23. A method for communicating over a light beam subject to major power variations at rates of occurrence less than a predetermined rate comprising the steps of:

modulating said beam at a major frequency substantially higher than said predetermined rate;
receiving said modulated beam; and
detecting only modulation of said received modulated beam in a narrow frequency band surrounding said major frequency.

24. The method of claim 23 comprising the additional step of:
rejecting the detection of modulation having a sudden time shift from the immediately preceding detected modulation.

25. The method of claim 24 comprising the additional step of:
further detecting subsequent to said rejecting step, each oscillation of said detected modulation.

26. The method, in a selective light beam deflection system which projects a zero-order beam along a normal zero-order path and which selectively deflects a substantial portion of said zero-order beam from said zero-order path to a deflected beam path at a predetermined average rate for communicating over said zero-order beam, comprising the steps of:

modulating said zero-order beam at a major frequency substantially higher than said average rate;
sensing said modulated zero-order beam; and
detecting only said higher major frequency modulation of said sensed modulated beam.

27. The method of claim 26 comprising the additional step of:
rejecting any detection of modulation of said sensed modulated beam having a sudden time shift from the immediately preceding detected modulation.

28. The method of claim 27 comprising the additional step of:
further detecting, subsequent to said rejection step, each oscillation of said detected modulation.

29. The method of claim 28, wherein said deflected beam moves in continuous fashion:
wherein said modulating step additionally comprises modulating said zero-order beam with a modulation whose oscillations are representative of said continuous motion of said deflected beam; and
comprising the additional step of tracking said further detected oscillations as an indication of said continuous motion of said deflected beam.

* * * * *